United States Patent [19]

Beermann

[11] Patent Number: 5,384,963
[45] Date of Patent: Jan. 31, 1995

[54] RAZOR KNIFE WITH AUTORETRACTING BLADE

[75] Inventor: Ewald H. Beermann, Solingen, Germany

[73] Assignee: Martor-Argentax E. H. Beermann KG, Solingen, Germany

[21] Appl. No.: 215,119

[22] Filed: Mar. 18, 1994

[51] Int. Cl.$^6$ .............................................. B26B 1/08
[52] U.S. Cl. ..................................... 30/162; 030/161
[58] Field of Search ................ 030/151, 162, 163, 335

[56] References Cited

U.S. PATENT DOCUMENTS

| | | | |
|---|---|---|---|
| 4,769,912 | 9/1988 | Davis | 30/162 |
| 4,949,458 | 8/1990 | Davis et al. | 30/162 |
| 5,203,085 | 4/1993 | Berns | 30/162 |

FOREIGN PATENT DOCUMENTS

| | | |
|---|---|---|
| 0244517 | 6/1991 | European Pat. Off. |
| 3727142 | 2/1989 | Germany |

*Primary Examiner*—Richard K. Seidel
*Assistant Examiner*—Hwei-Siu Payer
*Attorney, Agent, or Firm*—Herbert Dubno; Andrew Wilford

[57] ABSTRACT

A knife has a hollow body, a blade movable longitudinally on the body between an extended position projecting from the body and a retracted position substantially wholly contained within the body, a biasing element engaged between the body and the blade for urging the blade into the retracted position. A latch device is transversely engageable with the body in a latched position for holding the blade in the extended position and is out of engagement with the body in a release position permitting the biasing element to draw the blade into the retracted position. An electronic circuit in the body including a microelectronic accelerometer generates an output when the body is subjected to an acceleration exceeding a predetermined acceleration threshold. An actuator between the circuit and the latch puts the latch means in the release position when the detector generates the output.

12 Claims, 2 Drawing Sheets

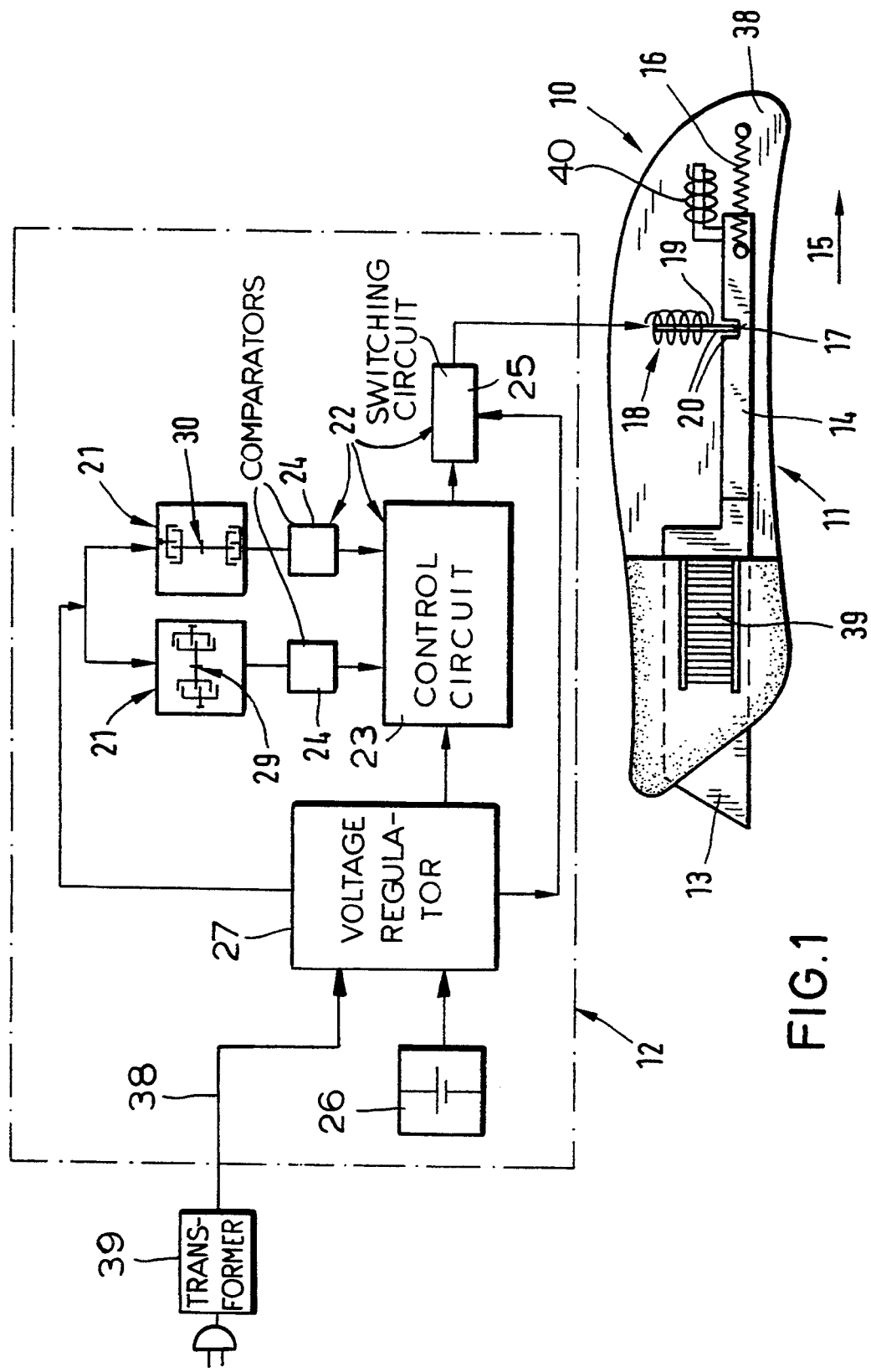

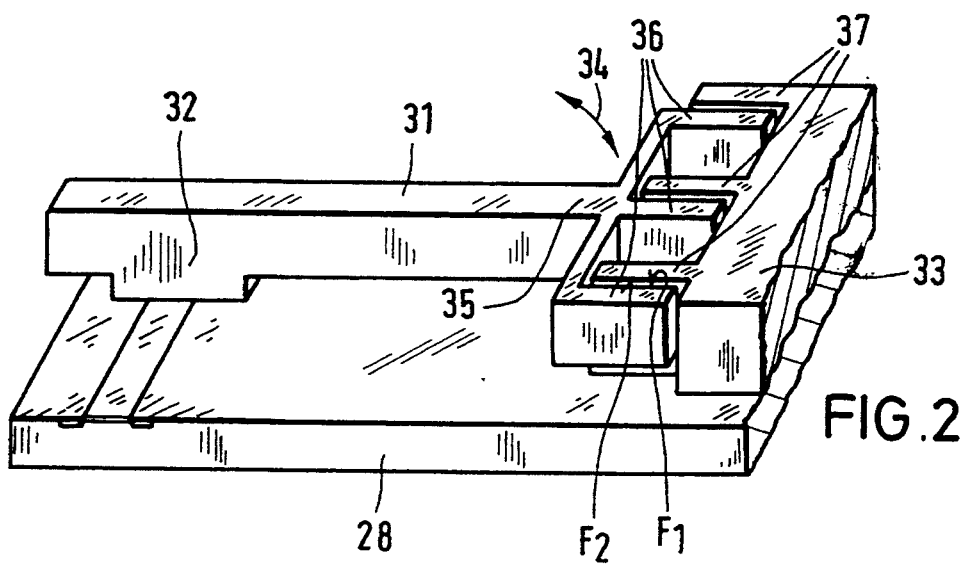
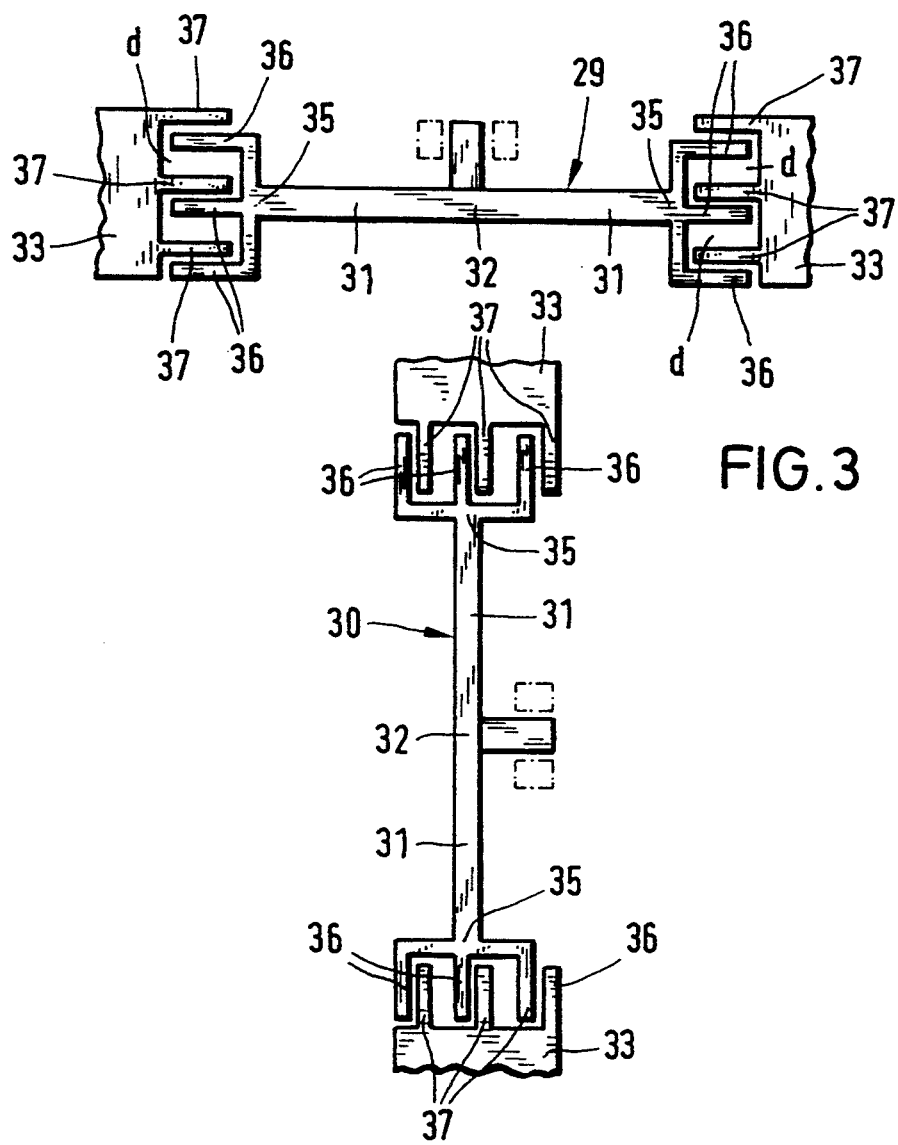

200

RAZOR KNIFE WITH AUTORETRACTING BLADE

FIELD OF THE INVENTION

The present invention relates to a knife with a retractable blade. More particularly this invention concerns such a knife whose blade automatically retracts under certain circumstances.

BACKGROUND OF THE INVENTION

A razor or utility knife is known whose blade retracts automatically if the knife is subjected to an acceleration above a certain threshold. Thus if the knife slips, so that it is moved very rapidly, the blade retracts into the grip body or handle. Since such acceleration normally only happens when the knife becomes disengaged from the object it is cutting and can therefore lead to an accident, this system protects the user.

In the system of EP 244,517 of R. Davis the retraction is effected by a tension spring and the blade is retained in its extended position by an inertial mass which frees the blade when subjected to excessive acceleration to allow the spring to retract it. The latching mechanism is formed by a detent tooth on an extension of the blade and a complimentarily formed seat in a lever on the grip body formed as the inertial mass that is loaded by a second spring as the blade is extended from the grip body to engage the detent tooth in its seat. If the knife with the handle is subjected to an unacceptable accelerated movement and the inertial forces of the one arm lever exceed the locking forces of the second spring of the latching mechanism as well as the outwardly effective friction, it is unlatched and the blade is pulled by the cylindrical coil spring back into the grip body.

U.S. Pat. No. 5,203,085 describes a system which has a latching spring of the latching mechanism formed as a longitudinally extending tension spring. The flat latching surface only actuated by the tip of the detent tooth extends when the blade is extended with its longitudinal axis generally tangentially to a circle centered on the pivot of the latching mechanism. The return forces determined by the sizes of the longitudinally stretched weak tension spring change very little in a mass-produced knife so that the result is an always reproducible response sensitivity of the latching mechanism. In addition this knife is known for the high threshold which is responsible for the cutting work and which prevents a retraction under load of the blade which is already slowed by the usual cutting work. This response threshold is determined by the tension of the latching spring in spite of the above-described tangential movement on the flat latching surface which appears to permit only a temporary stopping of the latching device through the known drawing-in of the limiting friction along with the latching device and the holding projection.

In these known knives the response threshold is always established purely mechanically so that it is necessary to take into account the sum of all friction forces that affect the inertial mass of the latching device, the latching spring, the bearings as well as their sliding and rolling friction. In case of accident the return speed into the grip body depends not only from the size of the energy store, which here is the loading of the coil spring effective on the extension, but also of the frictional and inertial forces of the purely mechanically acting latching device and its unlatching elements.

Furthermore, it has been shown that in particular applications the response sensitivity of the latching mechanism can vary over a wide range. Furthermore, the system is normally only responsive to acceleration in one direction, normally crosswise of the elongated body of the knife.

OBJECTS OF THE INVENTION

It is therefore an object of the present invention to provide an improved knife with an autoretracting blade.

Another object is the provision of such an improved knife with an autoretracting blade which overcomes the above-given disadvantages, that is which responds surely and rapidly, and whose response threshold can be set accurately even at a relatively low acceleration.

A further object is to provide such a safety autoretracting knife which will retract its blade when subjected to accelerations in different directions.

SUMMARY OF THE INVENTION

A knife has according to the invention a hollow body, a blade movable longitudinally on the body between an extended position projecting from the body and a retracted position substantially wholly contained within the body, and a biasing element engaged between the body and the blade for urging the blade into the retracted position. A latch device is transversely engageable with the body in a latched position for holding the blade in the extended position and is out of engagement with the body in a release position permitting the biasing element to draw the blade into the retracted position. An electronic circuit in the body including a microelectronic accelerometer generates an output when the body is subjected to an acceleration exceeding a predetermined acceleration threshold. An actuator between the circuit means and the latch means puts the latch means in the release position when the detector generates the output.

Thus an electronic accelerometer is used to sense when acceleration exceeds a threshold value. Such acceleration detectors of the capacitative type are known well, for example from German published patent application 3,727,142 filed Aug. 14, 1987 by W. Ehrfeld et al, and are particularly good for measuring small accelerations. Since the measurement of the acceleration as well as the unlatching of the latch device takes place electrically, that is virtually without delay, and since also the capacitative acceleration detectors are very small, e.g. 1000 $\mu$m high, 350 $\mu$m wide, and 3 $\mu$m thick, they are less dependent on the hitherto known large inertial forces of the known space-consuming actuators of the latch devices.

The blade according to the invention has an extension formed with a laterally directed detent and the latch device includes a laterally displaceable retaining element engageable with the detent in the latched position. The actuator can be an electromagnet operated by the circuit to pull the latch element out of engagement with the detent, which is normally formed as a pocket or seat while the element is a transversely slidable pin.

The accelerometer generates an output signal corresponding to acceleration and the circuit means includes a comparator for comparing the output signal with a threshold value for generating the output when the signal exceeds the threshold value. To respond to longitudinal and/or transverse and/or angular acceleration, the circuit includes two such accelerometers one of which is arranged transverse to the other to respond to acceleration transverse to a direction of acceleration to which the other accelerometer responds. Normally the accelerometers extend substantially at 90° to each other.

The accelerometer includes a bend-beam electrode having a portion fixed on the grip body and a free end deflectable relative to the body on acceleration of the body, and a counter electrode fixed on the body and closely juxtaposed with the free end. The free end and the counter electrode are formed with interdigitating teeth.

Each deflection of the freely movable detector beam of the accelerometer thus not only changes the size of the confronting surfaces of the capacitor formed by the movable electrode and counter electrode, but also changes the capacitance and thus the voltage on the two electrodes. With such a condenser there is therefore the following relationship between the voltage U across its electrodes, the electrical charge Q, the effective electrode surface A, the spacing d of the electrodes as well as the relative dielectric constant $\epsilon_r$ and the influence constant $\epsilon_o$:

$$U = (Q/A) \cdot [d/(\epsilon_r \epsilon_o)].$$

Since any change in electrical tension is directly proportional to the level of acceleration, it is possible by means of these voltage changes between the electrodes to determine acceleration changes which are evaluated by a corresponding actual-value/desired-value comparator to produce corresponding signals to release the latching device.

The knife according to the invention further has a power supply at least partially on the grip body for supplying electricity to the circuit means. This can be a battery mounted in the grip body or it can include a stepdown transformer outside the body and adapted to be connected to line and a low-voltage wire connected between the transformer and the circuit.

BRIEF DESCRIPTION OF THE DRAWING

The above and other objects, features, and advantages will become more readily apparent from the following description, reference being made to the accompanying drawing in which:

FIG. 1 is a largely schematic view of the knife according to the invention;

FIG. 2 is a large-scale perspective view of one of the accelerometers of the knife of this invention; and FIG. 3 is a large-scale top view of the accelerometer assembly of this invention.

SPECIFIC DESCRIPTION

As seen in FIG. 1 the new knife 10 has two grip shells not shown in detail which in a known manner are fitted together and releasably connected together by a screw. These grip shells thus together form a hollow grip body 11 containing the electronic circuit shown generally at reference 12 adjacent the body 11 for convenience of view.

The knife 10 is provided inside the grip body 11 with a blade 13 having an extension 14 on whose rear end relative to a longitudinal retraction direction 15 that is parallel to the grip-body longitudinal direction engages a biasing element 16 which in this case is formed of a cylindrical coil spring but which can also be replaced by an electromagnet. The extension 14 is provided with a laterally open detent or seat 17 in which a pin 19 actuatable by an electromagnet 18 can engage. This pin 19 forms a latching device 20 with the seat 17 of the extension 14. Engagement of the pin 19 in the seat 17 can be effected by gravity and the force of the spring 16 or mechanically by means of an unillustrated weak setting spring or electrically in that the current direction inside the electromagnet 18 is reversed from that used to pull out the pin 19.

Tensioning of the spring 16 can take place by hand in the manner described in above-cited EP 244,517 or U.S. Pat. No. 5,203,085.

On engagement of the pin 19 in the seat 17 the knife 10 is held in the illustrated extended working position while on unlatching of the latching pin 19 from the seat 17 the blade 13 is retracted by the biasing element 16 into the hollow grip body 11.

According to the invention there is inside the grip body 11 at least one microelectronic capacitative accelerometer 21 which is capable of detecting any translatory or angular acceleration and which is connected via an electrical control circuit 22 to the latching device 20 to release it on exceeding a predetermined threshold to let the blade 13 be retracted by the biasing element 16 into the hollow grip body 11. Instead of the capacitative accelerometer it is also possible to use a microelectronic inductive accelerometer.

The electrical control circuit 22 is advantageously comprised of an electronic calculating circuit 23 with an integrated actual-value/desired-value comparator 24 and an electric switch 25.

Between the voltage/current source 26 (electrical battery) and the capacitative accelerometer 21 is a voltage stabilizer 27 in order to ensure a nearly constant base voltage for the electrodes of the accelerometers 21 described in more detail with reference to FIGS. 2 and 3.

According to FIG. 3 the capacitive accelerometer 21 is formed of two biaxial accelerometers 29 and 30 arranged on the same substrate 28 at 90° to each other and having integrated signal processing in the form of a bend beam 31 serving as electrode and secured in its central region 32 with the substrate while being free to move relative to a fixed counter electrode 33 in its remaining regions in the direction of double-headed arrow 34 of FIG. 2. In this manner the free ends 35 of the bend beams 31 which are each provided with several comb teeth 36 can move freely relative to the counter electrodes 33 fixed on the substrate 28. The size of the effective electrode surface F1 of the comb teeth 36 can change relative to the corresponding surface F2 of the comb teeth 37 of the fixed counter electrode 33. Since the spacing d between the comb teeth 36 of the electrodes 29 and 30 and the comb teeth 37 of the counter electrode 33 remains the same, the voltage U between the electrodes 29 and 30 on one side and the counter electrodes 33 on the other side is directly proportional to the relationship of the electrical charge Q to the effective electrode surface area A which changes on deflection of the bend beam 31. The thus engendered changes in the voltage U are therefore a measure of the acceleration which is sensed by the accelerometers 29 and 30. The respective comparator 24 makes the appropriate actual-value/desired-value comparison to inform the circuit 23 quickly when the desired value is exceeded to actuate then the switch 25 and electromagnet 18 which pulls the latching pin 19 out of the detent 17 of the latching device 20 so that the knife blade 13 is retracted by the biasing element 16 in the direction of the arrow 15 into the hollow grip body 11 of the knife 10.

As mentioned above the biasing element 16 can be replaced by an electromagnet 40. In this case it is advisable to replace the battery serving as voltage/current source 26 by a low-voltage cable 38 connected for example to the rear end of the grip body 11 and supplying a voltage of 6 volt to 12 volt that is obtained from a low-voltage transformer 39 from the standard line voltage. Presuming that the capacitative accelerometers 21 get a voltage of from 1 volt to 1.5 volt, the circuit 23 is powered by a voltage of from 3 volt to 6 volt, and the electromagnets 18 for releasing the latching device 20 and the magnet 40 serving as biasing element that replaces the spring 16 gets a voltage of 6 volt to 12 volt, these various voltages for the various purposes are ideally derived from the corresponding low-voltage transformer 39 that is outside the grip body 11 and connected to it by the low-voltage cable 38. When a cylindrical spring 16 is used as energy source a 6 volt to 9 volt battery 26 in the hollow body 11 of the knife 10 can suffice to drive the circuit and electromagnet 18.

It is understood that for ergonomic reasons the battery is mounted in the center of gravity or near to the center of gravity in the knife 10.

I claim:

1. A knife comprising:
   a hollow grip body;
   a blade movable longitudinally in the body between an extended position projecting from the body and a retracted position substantially wholly contained within the body;
   biasing means in the body for urging the blade into the retracted position;
   latch means in the body transversely engageable with the blade in a latched position for holding the blade in the extended position and out of engagement with the blade in a release position permitting the biasing means to draw the blade into the retracted position;
   circuit means in the body including a microelectronic accelerometer for generating an output when the body is subjected to an acceleration exceeding a predetermined acceleration threshold; and
   actuating means between the circuit means and the latch means for putting the latch means in the release position when the accelerometer generates the output.

2. The knife defined in claim 1 wherein the blade has an extension formed with a laterally directed detent and the latch means includes a laterally displaceable retaining element engageable with the detent in the latched position.

3. The knife defined in claim 1 wherein the accelerometer generates an output signal corresponding to acceleration and the circuit means includes a comparator for comparing the output signal with a threshold value for generating the output when the signal exceeds the threshold value.

4. The knife defined in claim 1 wherein the circuit means includes two such accelerometers one of which is arranged transverse to the other to respond to acceleration transverse to a direction of acceleration to which the other accelerometer responds.

5. The knife defined in claim 4 wherein the accelerometers extend substantially at 90° to each other.

6. The knife defined in claim 1 wherein the accelerometer includes
   a bend-beam electrode having a portion fixed on the grip body and a free end deflectable relative to the body on acceleration of the body, and
   a counter electrode fixed on the body and closely juxtaposed with the free end.

7. The knife defined in claim 6 wherein the free end and the counter electrode are formed with interdigitating teeth.

8. The knife defined in claim 1, further comprising
   power-supply means at least partially on the grip body for supplying electricity to the circuit means.

9. The knife defined in claim 8 wherein the power-supply means is a battery mounted in the grip body.

10. The knife defined in claim 8 wherein the power supply means includes:
    a stepdown transformer outside the body, and
    a low-voltage wire connected between the transformer and the circuit means.

11. The knife defined in claim 1 wherein the blade has an extension formed with a laterally directed detent and the latch means includes a laterally displaceable retaining element engageable with the detent in the latched position, the circuit means including an electromagnet energizable to pull the latch means out of engagement with the detent.

12. The knife defined in claim 1 wherein the biasing means is a tension spring.

* * * * *

UNITED STATES PATENT AND TRADEMARK OFFICE
CERTIFICATE OF CORRECTION

PATENT NO: 5,384,963
DATED : January 31, 1995
INVENTORS: Ewald Helmut BEERMANN It is certified that error appears in the above-identified patent and that said Letters Patent is hereby corrected as shown below:

Cover page, between entry [22] (Filed) and entry [51] (Int cl.) read

-- [30] Foreign Application Priority Data
    Mar. 27, 1993    [DE]    Germany    4310037  --.

Signed and Sealed this

Ninth Day of May, 1995

Attest:

BRUCE LEHMAN

*Attesting Officer*    *Commissioner of Patents and Trademarks*